(12) United States Patent
Keith et al.

(10) Patent No.: US 10,179,383 B2
(45) Date of Patent: *Jan. 15, 2019

(54) LOCKOUT MECHANISM

(71) Applicant: Techtronic Power Tools Technology Limited, Tortola (VG)

(72) Inventors: James A. Keith, Pickens, SC (US); Ronald C. McCurry, West Union, SC (US)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 526 days.

This patent is subject to a terminal disclaimer.

(21) Appl. No.: 14/839,421

(22) Filed: Aug. 28, 2015

(65) Prior Publication Data

US 2015/0367471 A1 Dec. 24, 2015

Related U.S. Application Data

(63) Continuation of application No. 13/678,089, filed on Nov. 15, 2012, now Pat. No. 9,186,788.

(51) Int. Cl.
*B23Q 11/00* (2006.01)
*B25F 5/02* (2006.01)

(52) U.S. Cl.
CPC ............ *B23Q 11/0078* (2013.01); *B25F 5/02* (2013.01)

(58) Field of Classification Search
CPC ........ B23B 45/02; B23Q 11/0078; B25F 5/02
USPC ..... 173/217, 216, 29, 170; 451/461; 310/47, 310/50; 408/20; 464/177, 9; 429/97
See application file for complete search history.

(56) References Cited

U.S. PATENT DOCUMENTS

| | | | |
|---|---|---|---|
| 3,576,426 A | 4/1971 | Bernard | |
| 3,873,796 A * | 3/1975 | Worobec, Jr. | ............ H01H 3/20 200/320 |
| 3,971,906 A * | 7/1976 | Sahrbacker | ............... B25F 5/02 200/43.17 |
| 4,006,334 A | 2/1977 | Robotham et al. | |
| 4,016,684 A | 4/1977 | Urda | |
| 4,097,703 A | 6/1978 | Houser | |
| 4,097,705 A | 6/1978 | Harvell | |
| 4,444,091 A | 4/1984 | Jorgensen, Jr. | |
| 4,879,438 A | 11/1989 | Winchester | |
| 5,016,501 A | 5/1991 | Holzer, Jr. | |
| 5,138,243 A | 8/1992 | Kress et al. | |
| 5,145,193 A | 9/1992 | Rohm | |
| 5,383,875 A | 1/1995 | Bays et al. | |
| 5,577,600 A | 11/1996 | Schoene et al. | |
| 5,597,497 A | 1/1997 | Dean et al. | |
| 6,010,426 A | 1/2000 | Nakamura | |

(Continued)

FOREIGN PATENT DOCUMENTS

JP 2003170371 6/2003

*Primary Examiner* — Nathaniel Chukwurah
(74) *Attorney, Agent, or Firm* — Michael Best & Friedrich LLP

(57) ABSTRACT

A power tool including a power base and a tool head. The power base includes a trigger and a motor such that the trigger actuatable to drive the motor. The tool head is driven by the motor, and includes a lockout mechanism that inhibits actuation of the trigger in a locked. The lockout mechanism is manually rotatable from the locked position to an unlocked position in which the trigger is actuatable to drive the motor.

19 Claims, 13 Drawing Sheets

(56) References Cited

U.S. PATENT DOCUMENTS

| | | |
|---|---|---|
| 6,170,579 B1 | 1/2001 | Wadge |
| 6,176,322 B1 | 1/2001 | Wadge |
| 6,206,107 B1 | 3/2001 | Wadge |
| 6,274,828 B1 | 8/2001 | Chu |
| 6,286,611 B1 * | 9/2001 | Bone ................. B25F 3/00 173/170 |
| 6,338,404 B1 | 1/2002 | Chen |
| 6,428,339 B1 | 8/2002 | Davidson et al. |
| 6,479,918 B1 | 11/2002 | Burger et al. |
| 6,513,604 B2 | 2/2003 | Hanke |
| 6,753,490 B2 | 6/2004 | Svetlik et al. |
| 6,805,208 B2 | 10/2004 | Kusmierski et al. |
| 6,953,197 B2 | 10/2005 | Hartmann |
| 6,979,799 B2 | 12/2005 | Centner |
| 7,225,884 B2 | 6/2007 | Aeberhard |
| 7,261,016 B2 | 8/2007 | Miller |
| 7,397,153 B2 | 7/2008 | Buck et al. |
| 7,527,273 B2 | 5/2009 | Bordeianu |
| 7,536,980 B2 | 5/2009 | Bocka et al. |
| 7,736,217 B2 | 6/2010 | Blatz |
| 9,186,788 B2 * | 11/2015 | Keith ................. B23Q 11/0078 |
| 2003/0066667 A1 | 4/2003 | Zhang |
| 2007/0163793 A1 | 7/2007 | Aeberhard et al. |
| 2009/0200758 A1 | 8/2009 | Lam et al. |
| 2009/0260466 A1 | 10/2009 | Nakamura |
| 2010/0096152 A1 | 4/2010 | Chiu |
| 2010/0108338 A1 | 5/2010 | Hirt |
| 2010/0126745 A1 | 5/2010 | Zhu |
| 2010/0282485 A1 | 11/2010 | Puzio et al. |
| 2011/0272172 A1 | 11/2011 | Lau et al. |

\* cited by examiner

LOCKOUT MECHANISM

CROSS-REFERENCE TO RELATED APPLICATIONS

This application is a continuation of U.S. patent application Ser. No. 13/678,089, filed Nov. 15, 2012, the content of which is incorporated herein by reference in its entirety.

BACKGROUND

The present invention relates to a power tool system including a handle, or power base, and a tool head attachable to the power base. More specifically, the present invention relates to a lockout mechanism for preventing unintended actuation of a trigger for the power base.

Power tools utilize rotation of a motor to provide useful torque for operation such as drilling, driving fasteners, and the like. The motor drives the tool head and is actuated by a trigger located on the power base. Typically, the motor is not actuatable while the power tool is unassembled (i.e., when the tool head is not coupled to the power base) because a trigger lockout mechanism prevents the trigger from being depressible. However, upon engagement of the tool head with the power base, the trigger lockout mechanism is automatically unlocked. As a result, the user does not have control over whether or not the trigger remains locked because as long as the power tool is assembled the trigger lockout mechanism is unlocked.

SUMMARY

In some constructions, the invention provides a power tool including a power base and a tool head. The power base includes a trigger and a motor such that the trigger is actuatable to drive the motor, and the tool head, which is driven by the motor, includes a lockout mechanism that inhibits actuation of the trigger in a locked position. Additionally, the lockout mechanism is manually rotatable from the locked position to an unlocked position in which the trigger is actuatable to drive the motor.

Another construction of the invention provides a lockout mechanism movable between a locked position for inhibiting actuation of a trigger in a power tool assembly and an unlocked position for allowing actuation of the trigger. The lockout mechanism includes an actuator rotatable by a user between the locked position and the unlocked position, and a cam ring having cam surfaces coupled for rotation with the actuator. The lockout mechanism is configured such that rotation of the cam ring causes axial displacement of the cam ring to the unlocked position.

Another construction of the invention provides a method of actuating a power tool including the steps of attaching a tool head including a lockout mechanism to a power base wherein the power base houses a motor that drives the tool head and includes a trigger, which is normally locked. The method further includes rotating the lockout mechanism to unlock the trigger, and depressing the trigger to activate the motor while the lockout mechanism is rotated.

Other aspects of the invention will become apparent by consideration of the detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

DETAILED DESCRIPTION

Figure 1:
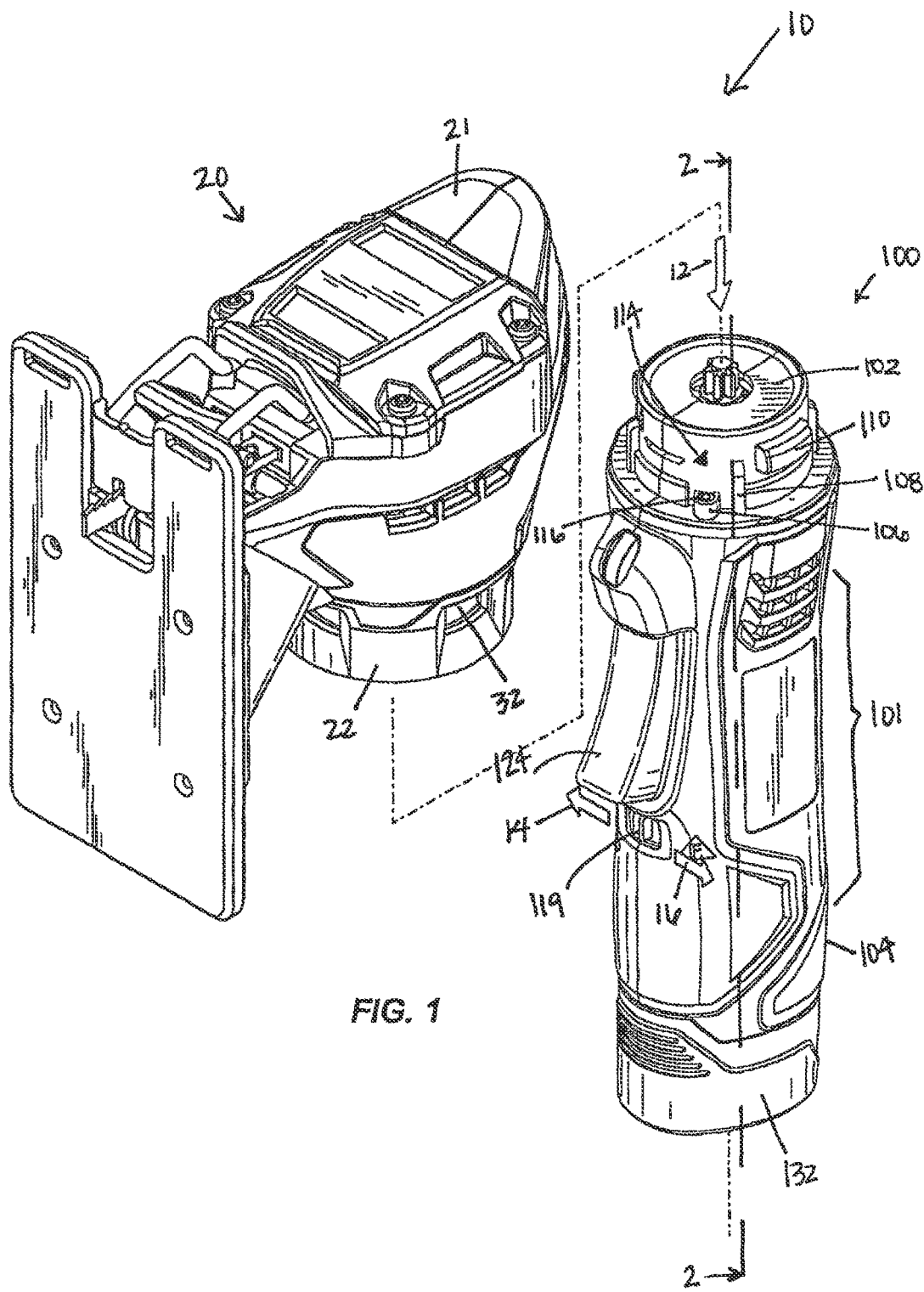
FIG. 1 is a perspective view of a power tool including a tool head and a power base.

FIG. 1 illustrates a power tool system 10 according to one construction of the invention. The power tool system 10 includes a tool head 20 and universal power base or power base 100. The universal power base 100 of the power tool system 10 is described in U.S. Patent Publication No. 2011/0272172, entitled "MULTI-FUNCTION TOOL SYSTEM", filed on Dec. 17, 2010, the entire contents of which are incorporated herein by reference. The power base 100 is capable of attaching a variety of tool heads, such as, a jigsaw tool head 20. In other constructions, other motor-driven tool heads may be attached to the power base 100. For example, tool heads such as an oscillating tool head, a right angle drill, a right angle impact driver, and right angle ratchet wrench may also be used. The tool head 20 and the power base 100 are aligned along a longitudinal axis A for connection between the tool head 20 and the power base 100. The longitudinal axis A is defined by the power base 100 having a grip portion 101 and by the head 20, as will be described in greater detail below. The arrow 12 indicates the direction for connection of the tool head 20 to the power base 100, which is parallel to the longitudinal axis A. In other constructions, the power tool system 10 is a power tool having a single piece construction in which the tool head is not removable from the power base.

Figure 2:
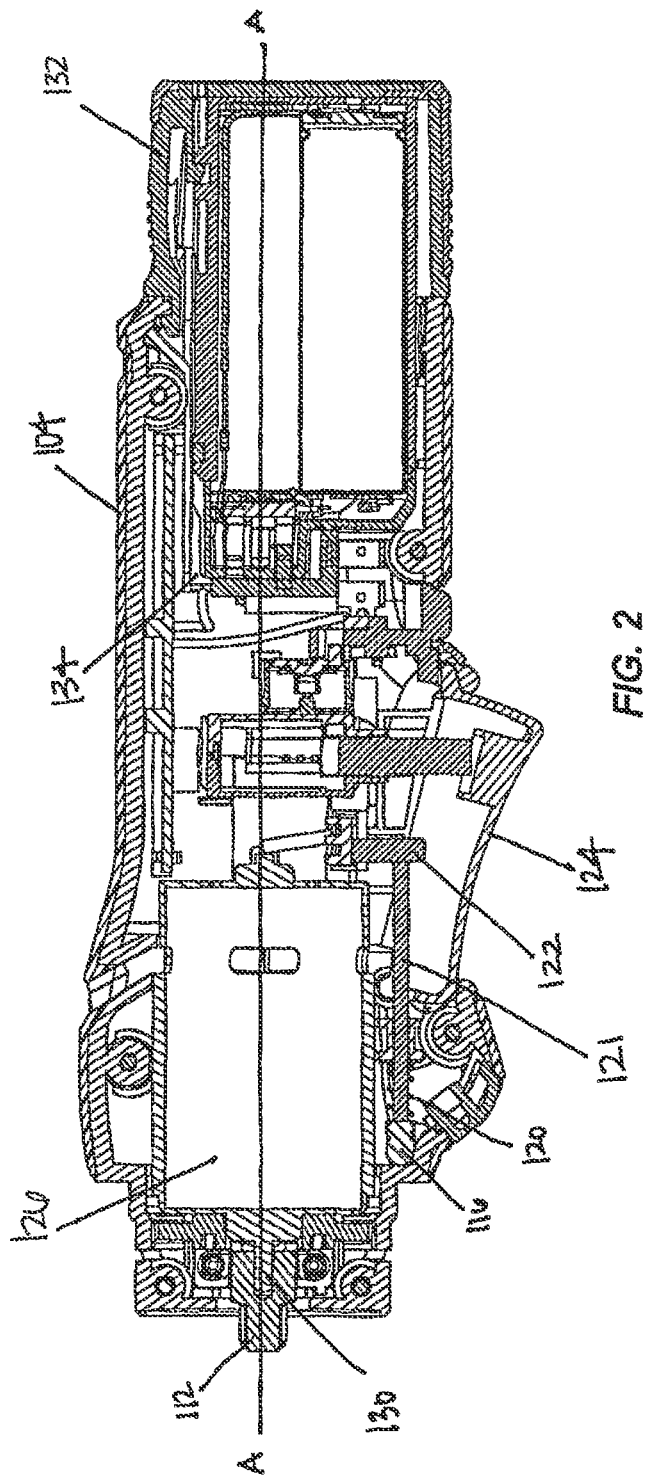
FIG. 2 is a cross-sectional view of the power base taken through line 2-2 of FIG. 1.
Figure 3:
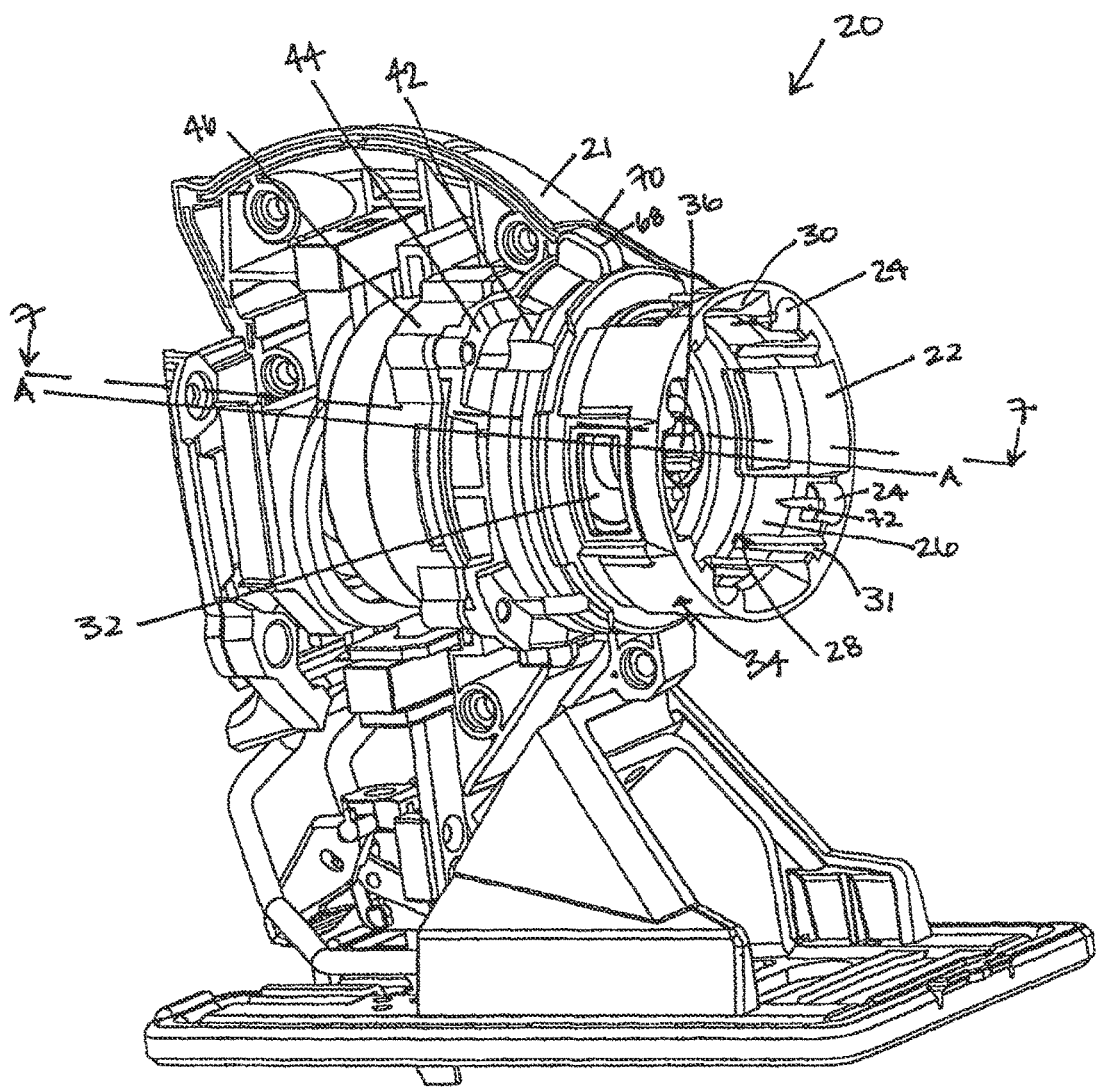
FIG. 3 is a perspective view of the tool head of FIG. 1 having a portion of the housing removed.
Figure 4:
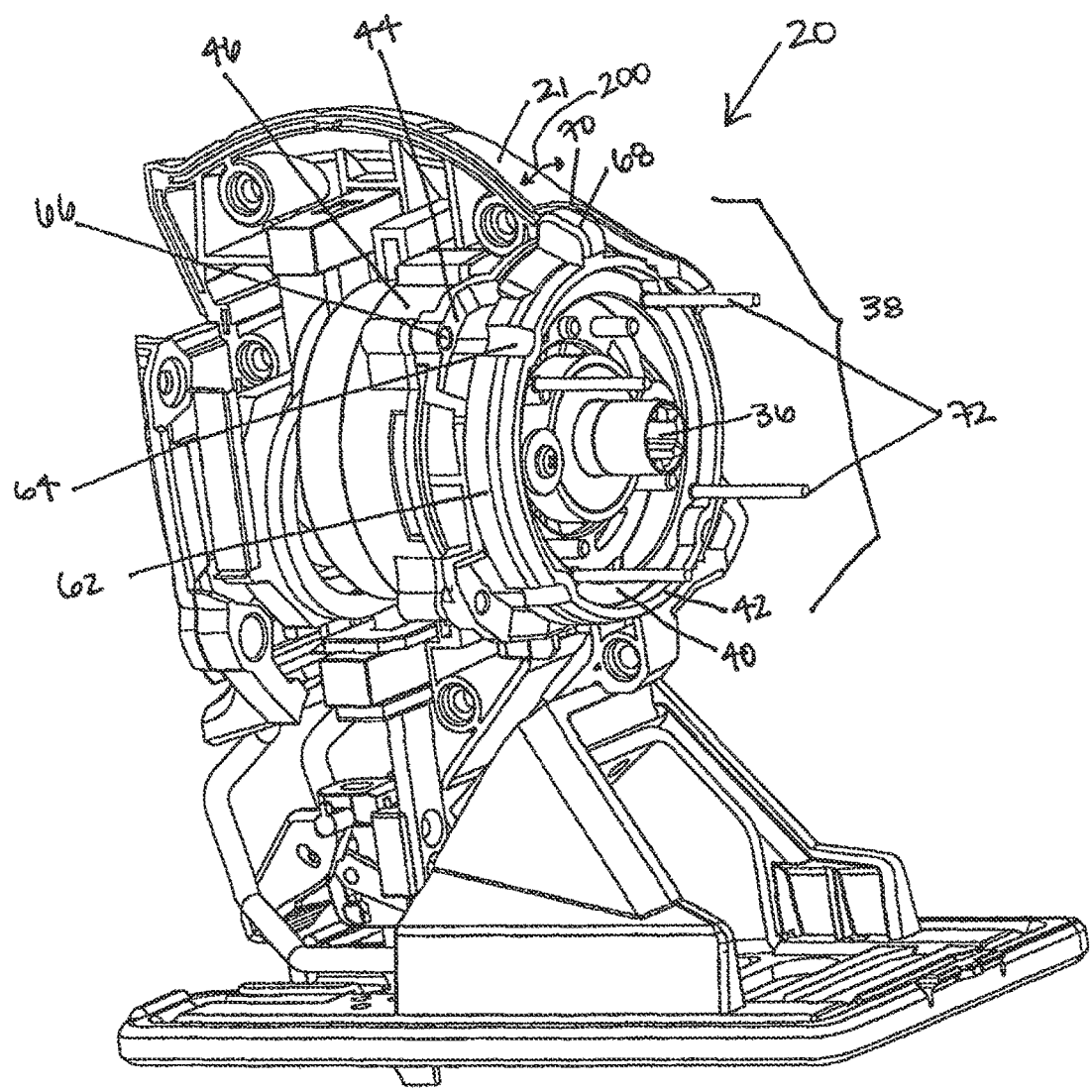
FIG. 4 is a perspective view of the tool head of FIG. 3 having a portion of the housing and a tool head interface removed, the tool head having a lockout mechanism according to a first embodiment of the invention.
Figure 5:
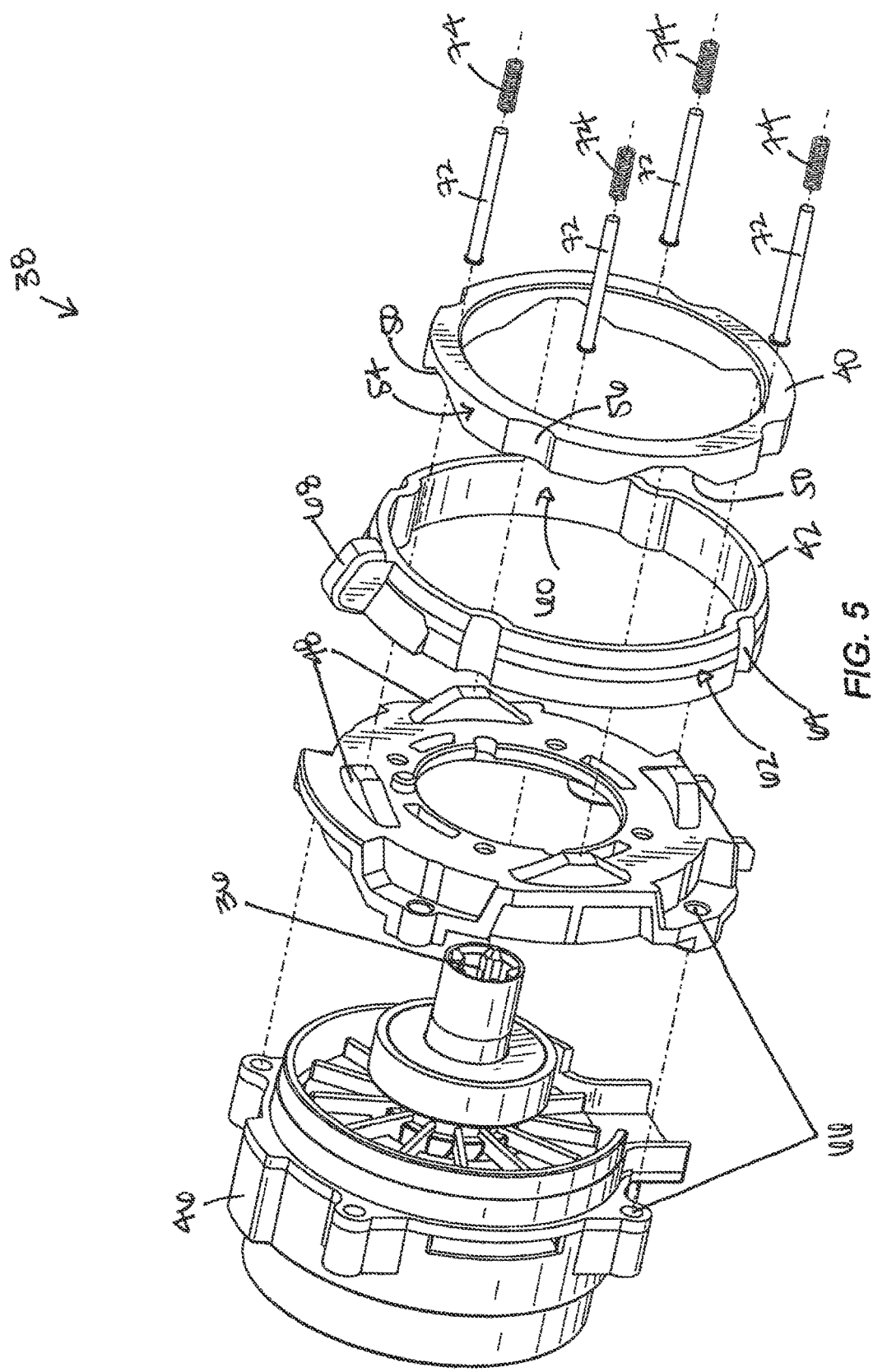
FIG. 5 is an exploded view of the lockout mechanism of FIG. 4 including a gearcase backplate, a switch ring, a cam ring, a plurality of pins, and a plurality of springs.
Figure 6:
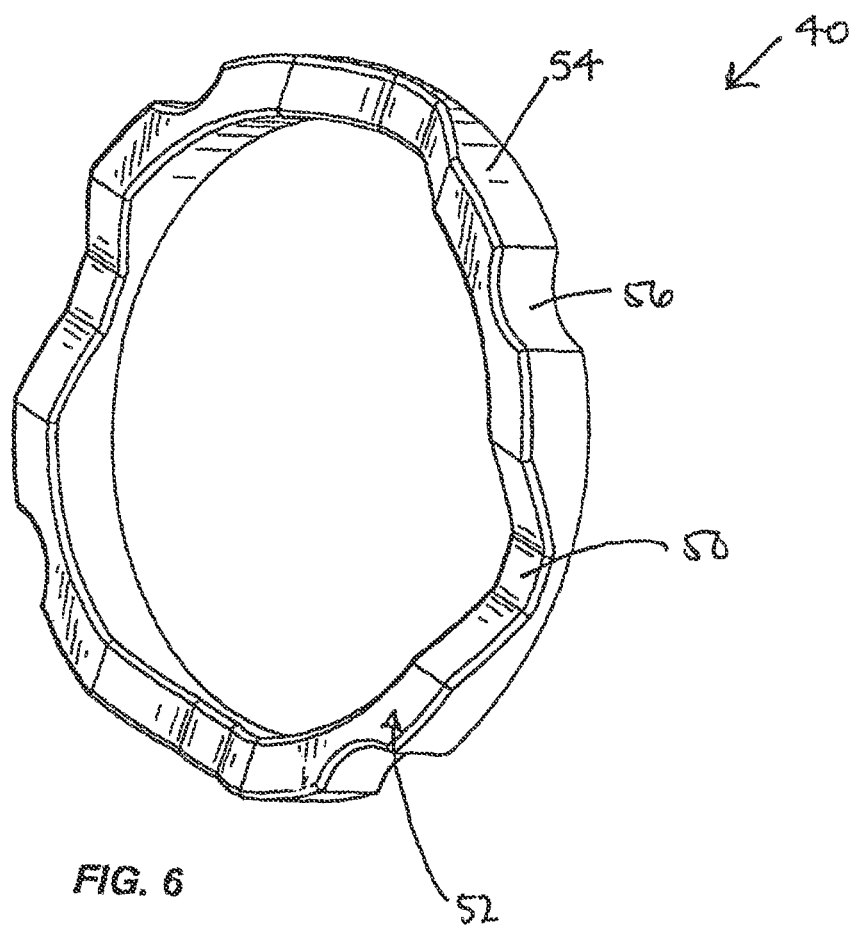
FIG. 6 is perspective view of the cam ring of FIG. 5.

Referring to FIGS. 1-3, the tool head 20 includes a housing 21 having a tool head interface 22. The tool head interface 22 includes semi-circular cavities 24. Four equally spaced cavities 24 are spaced radially about the axis A on an inner surface 26 of the tool head interface 22, the inner surface 26 defining a main cavity 28. The tool head interface 22 also includes axial grooves 30 and axial slots 31. Four equally spaced grooves 30 and four equally spaced slots 31 lie generally parallel to the axis A and are disposed on the inner surface 26 of the tool head interface 22. In other constructions, fewer or more grooves and slots may be employed.

Further with respect to FIG. 3, the tool head interface 22 also includes rectangular openings or recesses 32 positioned circumferentially about the tool head 20, and extending between the inner surface 26 and an outer surface 34 of the interface 22. In the illustrated construction, four openings 32 are equally spaced from each other about the axis A; however, in other constructions, fewer or more openings may be employed and the openings may include other shapes. The tool head interface 22 also includes a star-shaped central opening or central recess 36 centered about the axis A.

With renewed reference to FIGS. 1 and 2, the power base 100 includes a housing 104 having a power base interface 102. As the features of the tool head interface 22 are formed on the inner surface 26 of the head interface 22, the features of the power base interface 102 are formed on an outer surface 114 of the power base interface 102. The power base interface 102 includes a boss 106, which is a circular ring-shaped or U-shaped boss extending from the outer surface 114 of the power base interface 102 generally parallel to the axis A. In other constructions, more than one boss 106 may be employed.

The power base interface 102 also includes ridges 108 extending substantially parallel to axis A and projecting radially from the outer surface 114 of the power base interface 102. In other constructions, fewer or more ridges and grooves may be employed. The power base interface 102 also includes rectangular radial projections 110 extending from the housing 104 radially away from the axis A. In the illustrated construction, two projections 110 are employed; however, in other constructions, fewer or more projections may be employed and the projections may have a shape other than rectangular. The power base interface 102 also includes the motor drive shaft projection 112 centered about the axis A and extending from a motor drive shaft 130.

As illustrated in FIG. 2, the power base 100 includes a motor 126 powered by a removable and rechargeable battery pack 132. In the illustrated construction, the battery pack 132 is a 12-volt battery pack and includes three (3) Lithium-ion battery cells. In other constructions, the battery pack may include fewer or more battery cells such that the battery pack is a 14.4-volt battery pack, an 18-volt battery pack, or the like. Additionally or alternatively, the battery cells may have chemistries other than Lithium-ion such as, for example, Nickel Cadmium, Nickel Metal-Hydride, or the like. The battery pack 132 is inserted into a cavity 134 in the power base housing 104 in the axial direction of axis A in order to snap into place. In other constructions, the power base 100 may include a cord and be powered by a remote source of power, such as a utility source connected to the cord. In yet other constructions, the motor 126 may be a pneumatic motor or other type of suitable motor and may be powered by other sources, such as compressed air.

The power base 100 also includes a forward/reverse switch 119 (FIG. 1) having a first position, indicated by the arrow 14, for running the motor 126 in a first direction and a second position, indicated by the arrow 16, for running the motor 126 in a second direction opposite the first direction (e.g., forward and reverse).

To assemble the tool head 20 with the power base 100, the tool head interface 22 receives the power head interface 102. Thus, the exterior surface 114 of the power base interface 102 generally mates with the inner surface 26 of the head interface 22 such that the main cavity 28 in the tool head interface 22 receives the power base interface 102. Further, one of the cavities 24 receives the boss 106 while the slots 31 receive the ridges 108. Also, the rectangular openings 32 receive the radial projections 110 on the power base interface 102. In the illustrated construction, there are four openings 32 and two projections 110. Preferably, the number of openings 32 is at least equal to the number of projections 110, although there may be more openings 32 to allow the head 20 to be attached to the power base 100 in various orientations, and the shape of the projections mate with the shape of the openings. Additionally, the central opening 36 receives the motor drive shaft projection 112 of the power base interface 102. Therefore, the motor drive shaft 130, motor drive shaft projection 112 and central opening 36 cooperate to define the longitudinal axis A, which is parallel and collinear when the head 20 is attached to the power base 100. Alternate constructions may employ a second motor drive shaft projection to further extend the drive shaft 130 for connecting to some tool heads. In the illustrated construction, the motor drive shaft projection 112 is star-shaped to accommodate the central opening 36, which is a six-point star shape with rounded tips. In other constructions, the motor drive shaft projection 112 and central opening 36 may have other shapes suitable for transferring rotational motion from the motor drive shaft projection 112 to the tool head 20.

With respect to FIGS. 3-6, the tool head 20 includes a trigger lockout mechanism 38 positioned within the housing 21 and extending into the cavities 24 of the tool head interface 22, as illustrated in FIG. 3. The trigger lockout mechanism 38 includes a cam ring 40 disposed concentrically within a switch ring 42 such that both are disposed axially adjacent to a backplate 44 of a gearcase 46. The backplate 44 is secured to the gearcase 46 via fasteners (not shown) that extend through mating apertures 64, 66. The backplate 44 of the gearcase 46 includes four raised lugs or projections 48 spaced radially about axis A. The projections 48 are sized and shaped to be received within recessed surfaces 50 (FIG. 6) on a proximal surface 52 of the cam ring 40. The recessed surfaces 50 are cam surfaces that ride the projections 48 when the cam ring 40 is rotated relative to the back plate 44 such that the cam ring 40 moves axially when rotated. The illustrated construction includes four raised projections 48 and four recessed surfaces 50. In other constructions fewer or more projections 48 and recessed surfaces 50 may be employed.

An outer circumferential surface 54 of the cam ring 40 also includes four auxiliary recesses 56 that receive lugs 58 on an inner surface 60 of the switch ring 42, such that the cam ring 40 fits concentrically within the switch ring 42 and is coupled for rotation therewith. An outer surface 62 of the switch ring 42 includes grooves 64 that accommodate fasteners (not shown) that anchor the trigger lockout mechanism 38 to through apertures 66 in the gearcase 46. The symmetry of the raised lugs 48 on the backplate 44 ensures that the switch ring 42 is manually rotatable in two directions (i.e., clockwise about axis A and counterclockwise about axis A) as indicated by double headed arrow 200 (FIG. 1) from a first or locked position (center) to an unlocked position (either clockwise or counterclockwise about axis A). The switch ring 42 is manually rotatable by way of a switch ring actuator 68 that extends through a window 70 in the housing 21. Because the cam ring 40 fits concentrically within the switch ring 42, the switch ring 42 is biased in the neutral position as a result of the engagement between the recessed surfaces 50 of the cam ring 40 and the raised lugs 48 on the backplate 44. Springs 74, which will be described in further detail below, help maintain the neutral placement of the switch ring.

The trigger lockout mechanism 38 includes pins, or actuators, 72 extending generally parallel to the axis A and projecting into the semi-circular cavities 24. The four equally spaced pins 72 and cavities 24 are spaced radially about the axis A on an inner surface of the tool head interface 22. The pins 72 are positioned at a first radial distance from the axis A. Each of the four pins 72 is paired with a spring 74 (FIGS. 7 and 8) for biasing the pins 72 towards the cam ring 40. There are four pins 72 such that the tool head 20 is connectable to the power base 100 in one of four orientations. Therefore, in any one of the four orientations, one of the cavities 24 receives the boss 106 on the power base interface 102 such that one of the pins 72 is received by the boss 106. In further constructions, there may be more or fewer cavities 24, pins 72, and springs 74.

Rotation of the switch ring 42 in either direction along arrow 200 to one of the unlocked positions by the switch ring actuator 68 simultaneously rotates the cam ring 40 therewith. Actuation of the switch ring actuator 68 causes the surfaces 50 to ride the projections 48 thereby displacing the cam ring 40 in an axial direction generally parallel to the axis A and away from the backplate 44 towards the power base. Axial displacement of the cam ring 40 communicates axial displacement of the one pin 72 received within the boss 106. The other pins 72 not received within the boss 106 are also displaced, but are redundant to allow the tool head 20 to be attached to the power base 100 in multiple orientations about the axis A. As such, the one pin 72 is displaced in an axial direction generally parallel to the axis A and away from the backplate 44 towards the power base, and therefore into contact with a lockout button 116 to actuate the lockout button 116, described in further detail below. The cam ring 40, which is biased to return to the locked position, returns to the locked position such that the surfaces 50 are once again mated with the projection 48 such that the cam ring 40, and therefore the one pin 72, are no longer axially displaced away from the backplate 44. As such, the one pin 72 no longer contacts the lockout button 116.

With renewed reference to FIGS. 1 and 2, the trigger lockout mechanism 38 is used in conjunction with a button 116 in the power base. The boss 106 includes a central opening 118 in which the button 116 and linkage 121 are disposed, the central opening 118, button 116, and linkage 121 extending in a direction substantially parallel to the longitudinal axis A. The linkage 121 connects the button 116 to a trigger stop 122, such that movement of the button 116 results in movement of the trigger stop 122. The button 116 is positioned at a second radial distance from the longitudinal axis A, which is substantially equal to the first radial distance of the pins 72. The button 116 is a safety device that prevents the motor 126 from being activated until the operator manually unlocks the trigger lockout mechanism 38. The button 116 is biased by a biasing member 120, such as a spring, to a locked position (FIG. 7) in which the button 116 is extended in the boss 106, i.e., away from the motor 126. In the locked position, the trigger stop 122 prevents a trigger 124 in the housing 104 of the power base 100 from being moved to an actuated position, thus preventing the motor 126 from being activated. The button 116 is depressed and moved substantially parallel to the longitudinal axis A to an unlocked position (FIG. 8) when one of the pins 72 of the head interface 22 is received in the central opening of the boss 106. In the unlocked position, the button 116 is recessed in the boss 106. The one pin 72 engages the button 116 to depress the button 116, which positions the switch trigger stop 122 to allow the trigger 124 to be actuated to activate the motor 126. The button 116, or safety device, inhibits the motor 126 from being operable until the operator manually unlocks the trigger 124. In other constructions, the power base 100 may include other types of safety devices for inhibiting activation of the motor that are actuatable by the trigger lockout mechanism 38. For example, the safety device may be electronic, such as a control system.

Figure 7:
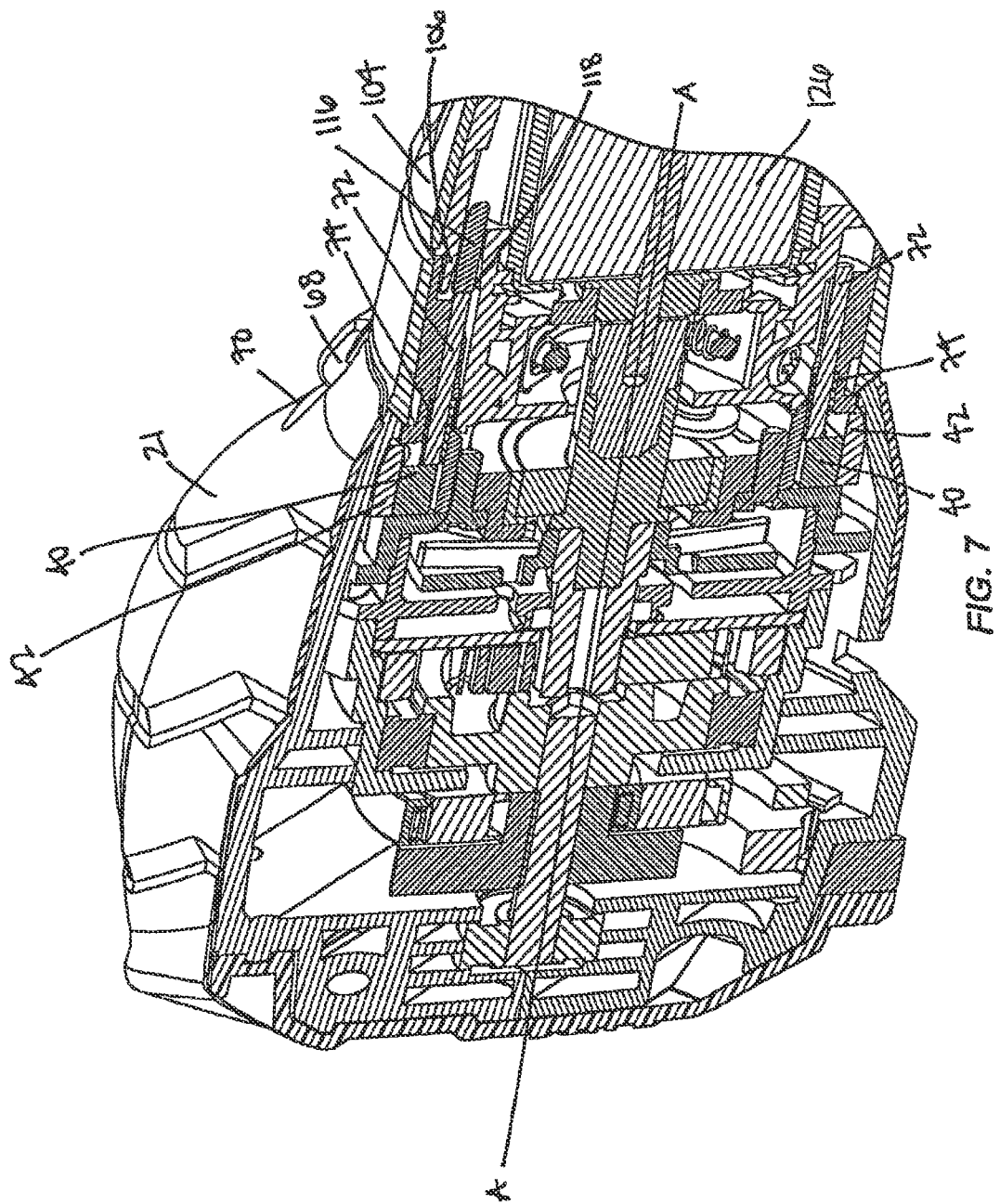
FIG. 7 is a cross-sectional view of the tool head taken through line 7-7 of FIG. 3 illustrating the lockout mechanism in a locked state.

With reference to FIG. 7, in operation, the tool head 20 is coupled with the power base 100 in order to be driven by the motor 126. The head interface 22 is radially symmetrical and can be divided into four equal parts such that the tool head may be coupled to the power base 100 in four different rotational orientations positioned about the axis A. The openings 32 in the tool head interface 22 receive the projections 110 in the power base interface 102 to hold the tool head 20 in place relative to the power base 100. At the same time, one of the four cavities 24 mate with the boss 106, and the ridges 108 mate with the slots 31 to align the tool head 20 with the power base 100 in one of the four orientations. Further, the motor drive shaft projection 112 mates with the central opening 36 to drivingly connect the motor 126 to the tool head.

Figure 8:
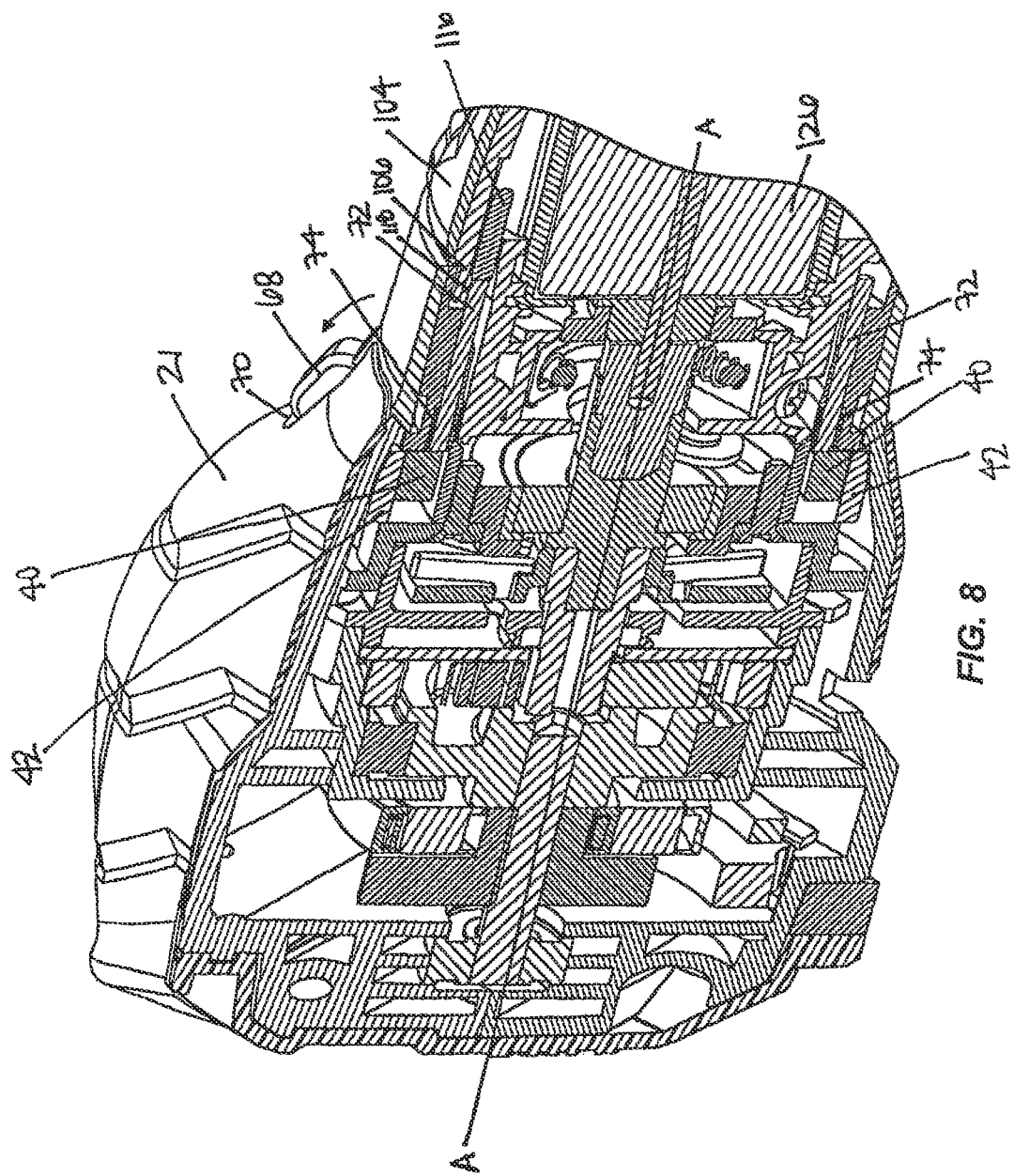
FIG. 8 is a cross-sectional view of the tool head similar to that of FIG. 7, but illustrating the lockout mechanism in an unlocked state.
Figure 9:
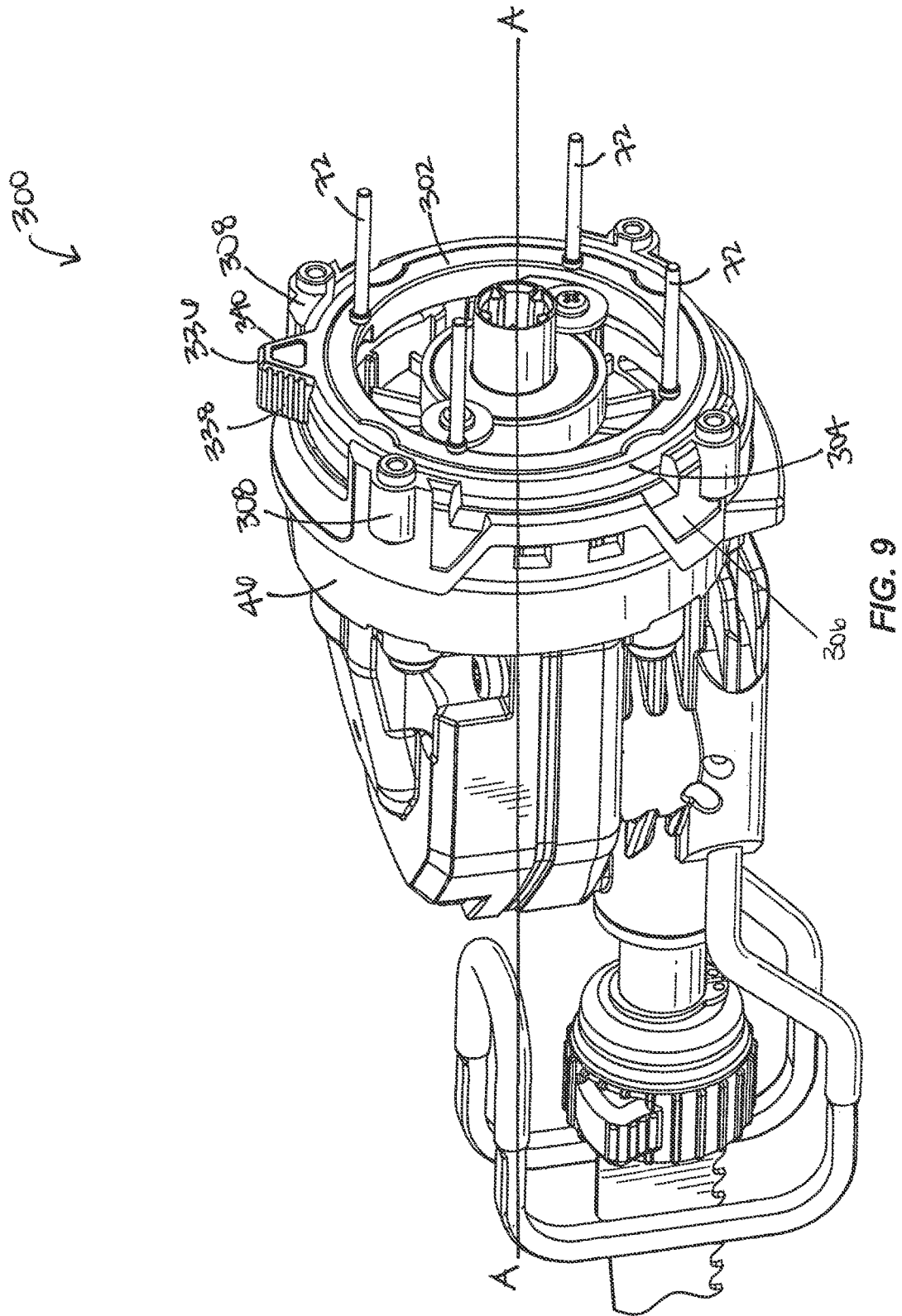
FIG. 9 is a perspective view of a tool head having a portion of the housing and a tool head interface removed, the tool head having a lockout mechanism according to another embodiment of the invention.
Figure 10:
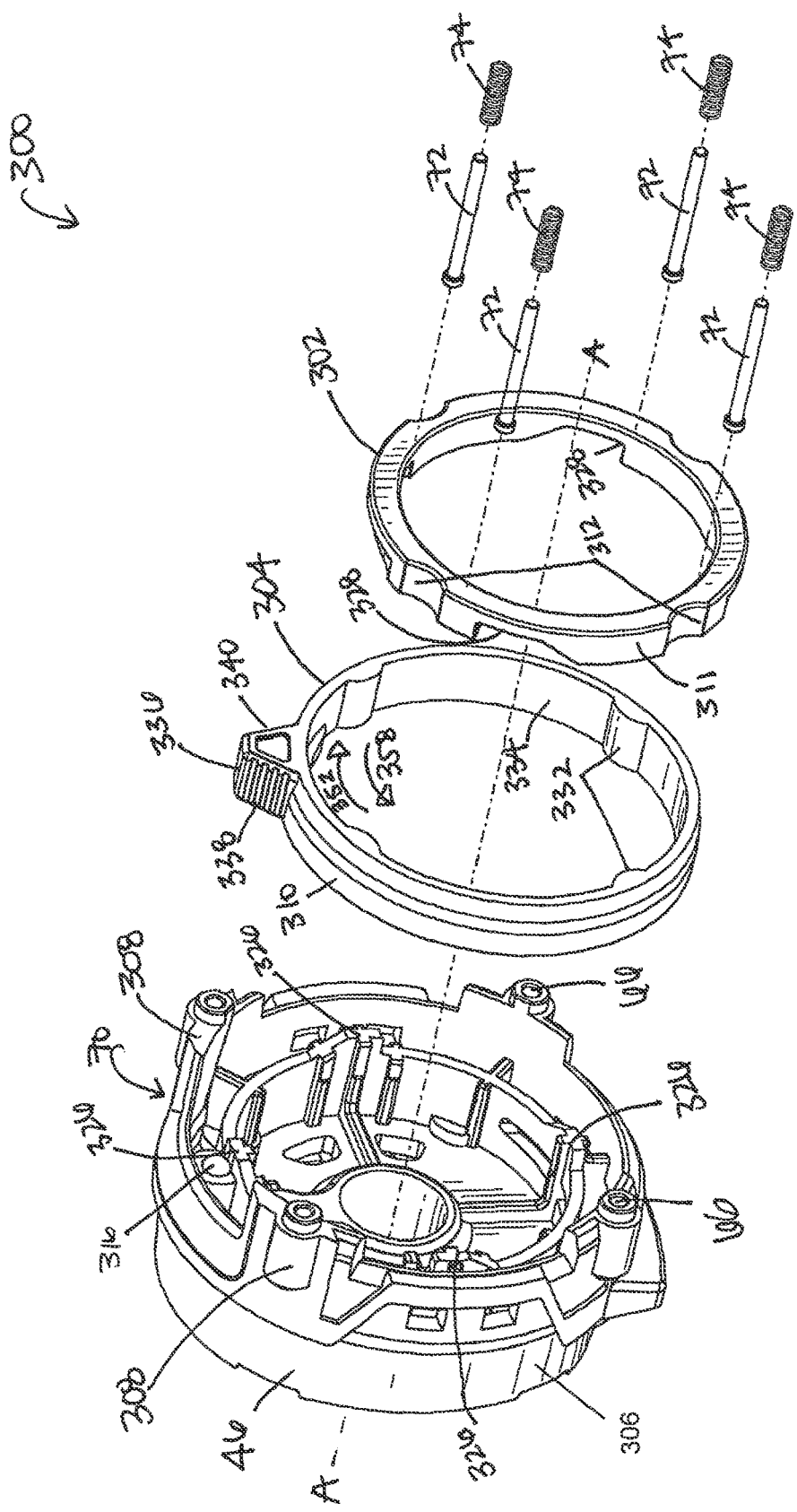
FIG. 10 is an exploded view of the lockout mechanism of FIG. 10 including a gearcase backplate, a switch ring, a cam ring, a plurality of pins, and a plurality of springs.
Figure 12:
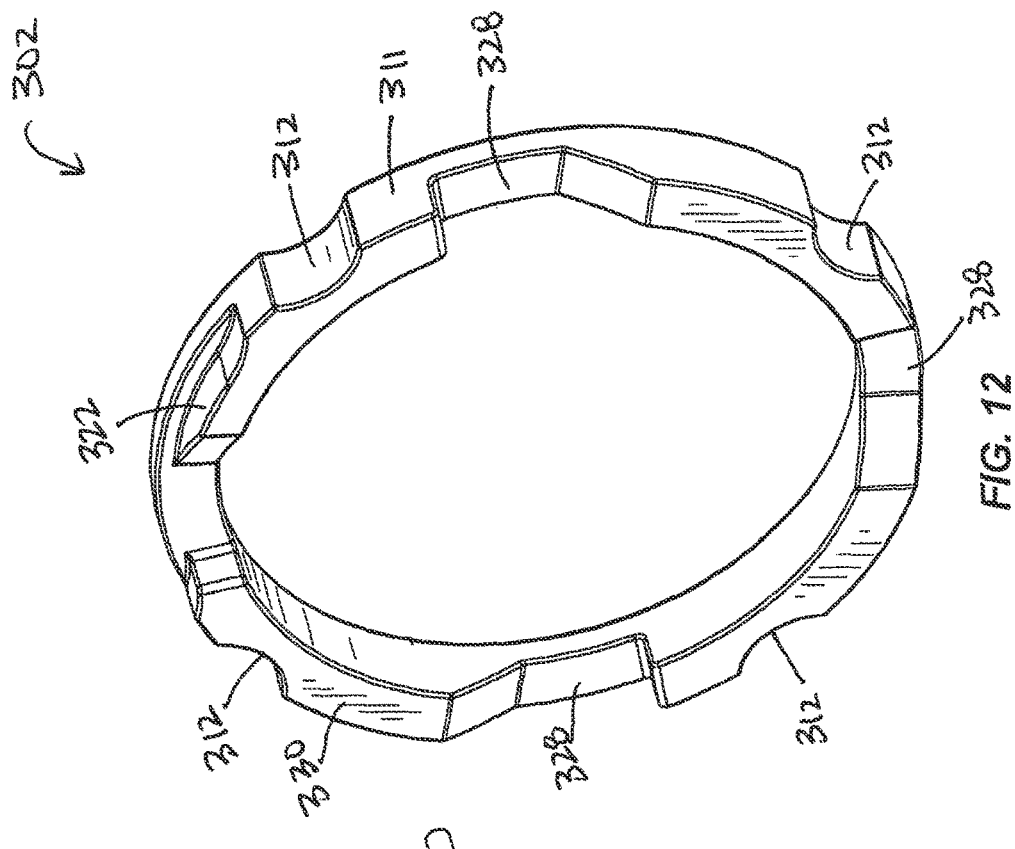
FIG. 12 is perspective view of the cam ring of FIG. 10.
Figure 11:
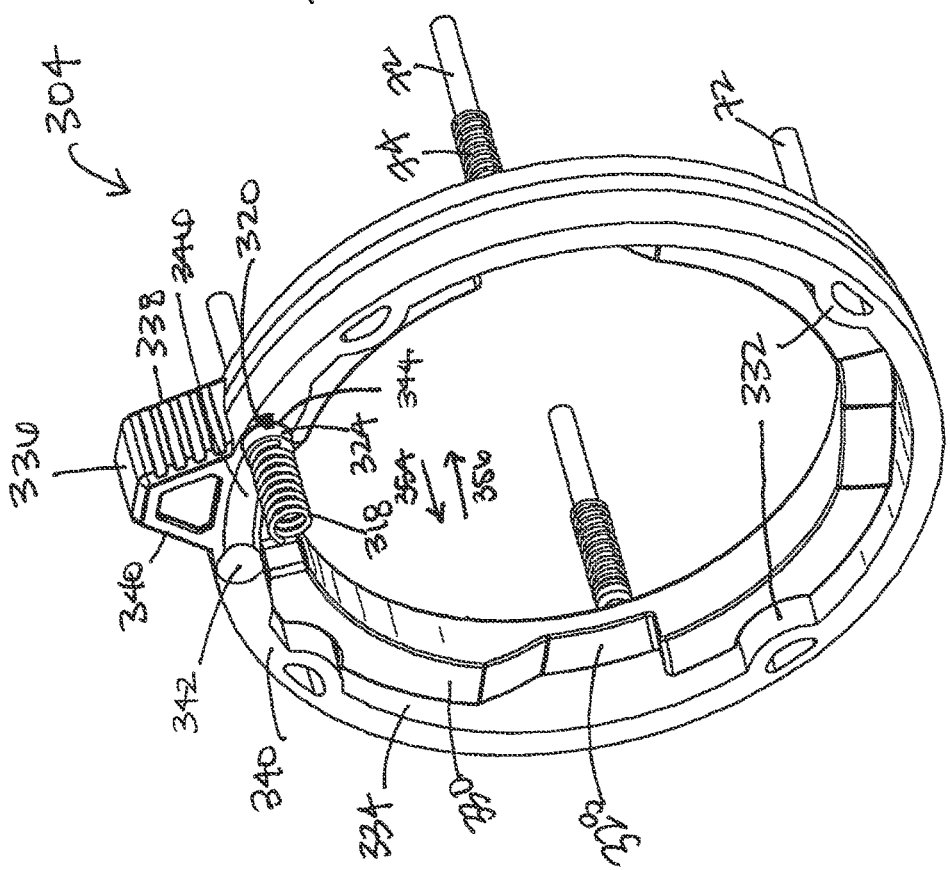
FIG. 11 is an enlarged, assembled view of a detent mechanism relative to the switch ring, the cam ring, the plurality of pins, and the plurality of springs of FIG. 10.

To operate the tool, the operator actuates or rotates the switch ring 42 via the switch ring actuator 68 that extends though window 70 in the housing 21 of the tool head 20. Rotation of the switch ring 42 rotates the cam ring 40 such that the cam ring 40 moves axially toward the power base 100 due to its camming arrangement with the gearcase backplate 44. As the cam ring 40 moves towards the power base 100, one of the four pins 72 received within the central opening 118 of the boss 106 is pushed toward the power base 100 against the bias of the springs 74 and thus toward the button 116 in the power base 100 (FIG. 8). When one of pins 72 contacts and depresses the button 116, the trigger 124 is depressible. The trigger 124 on the power base 100 activates the motor 126 to drive the tool head 20 as long as the button 116 is depressed. Initial actuation of the switch ring 42 via the switch ring actuator 68 enables the trigger 124 to depressible. Once the trigger 124, and therefore the button 116, is depressed, the button 116 will continue to depress the trigger stop 122 until the trigger 124 is no longer depressed (i.e., it is released). In other words, the switch ring 42 does not need to be continually actuated in order to maintain activation of the motor 126 as long as the trigger 124 remains depressed. Once the trigger 124 is released, the button 116 and the switch ring 42 automatically return to their locked positions thereby locking the trigger 124 until the switch ring 42 is re-actuated.

FIGS. 9-14 illustrate a trigger lockout mechanism 300 according to another embodiment of the invention. The trigger lockout mechanism 300 of FIGS. 9-14 is similar to the trigger lockout mechanism 38 of FIGS. 3-6 and is oriented similarly with respect to the tool head 20; therefore, like structures will be identified by like reference numbers and only the differences will be discussed hereafter.

With respect to FIGS. 9-12, the trigger lockout mechanism 300 includes a cam ring 302 disposed concentrically within a switch ring 304 such that both are disposed axially adjacent to a backplate 306 of the gearcase 46. The backplate 306 includes arms 308 that extend along an outer surface 310 of the switch ring 304. The backplate 306 secures the tool head interface 22 to the gearcase 46 via fasteners (not shown) that extend through apertures 66. In the illustrated embodiment, the gearcase 46 and the backplate 306 are integrally formed; in other embodiments the backplate 306 may be secured to the gearcase 46 by any suitable means.

The backplate 306 includes an aperture 316 (FIG. 10) that is centrally located between a pair of adjacent arms 308. The aperture 316 is sized to receive a detent mechanism, which includes a spring 318 and a bumper 320 having a shaft (not shown) and a rounded, protrusion 324. The spring 318 is disposed within the aperture 316 such that it receives the shaft and abuts the protrusion 324.

The backplate 306 of the gearcase 46 also includes four raised projections 326 spaced radially about the axis A. The projections 326 are sized and shaped to be received within recessed surfaces 328 (FIG. 12) on a proximal surface 330 of the cam ring 302. The recessed surfaces 328 are cam surfaces that ride the projections 326 such that the cam ring 302 moves axially when rotated. The illustrated construction includes four raised projections 326 and four recessed surfaces 328. In other constructions fewer or more projections 326 and recessed surfaces 328 may be employed. The proximal surface 330 also includes a gradual recess 322 that allows smooth rotation of the switch ring 304, described below.

An outer circumferential surface 311 of the cam ring 302 also includes four auxiliary recesses 312 that receive lugs 332 on an inner surface 334 of the switch ring 304, such that the cam ring 302 fits concentrically within the switch ring 304 and is coupled for rotation therewith. The switch ring 304 includes a switch ring actuator 336 having a first surface 338 and a second surface 340 that extends between arms 308 of the backplate 306 and through a window 70 in the tool housing 21. The switch ring 304 further includes a rear surface having a first recess 342 connected to a second recess 344 by an arcuate recess 346 therebetween; the recesses 342, 344, 346 are configured to receive the protrusion 324 of the detent mechanism. A depth of the first and second recesses 342, 344 is greater than a depth of the arcuate recess 346. The first and second recesses 342, 344 are located on opposite sides of the switch ring actuator 336. The switch ring 304 is manually rotatable between a first or unlocked position 348 (FIG. 13) and a second or unlocked position 350 (FIG. 14) by way of the switch ring actuator 336. The locked position 348 is maintained by receipt of the protrusion 324 of the detent mechanism in first recess 342, while the unlocked position 350 is maintained by receipt of the protrusion 324 in the second recess 344.

Figure 13:
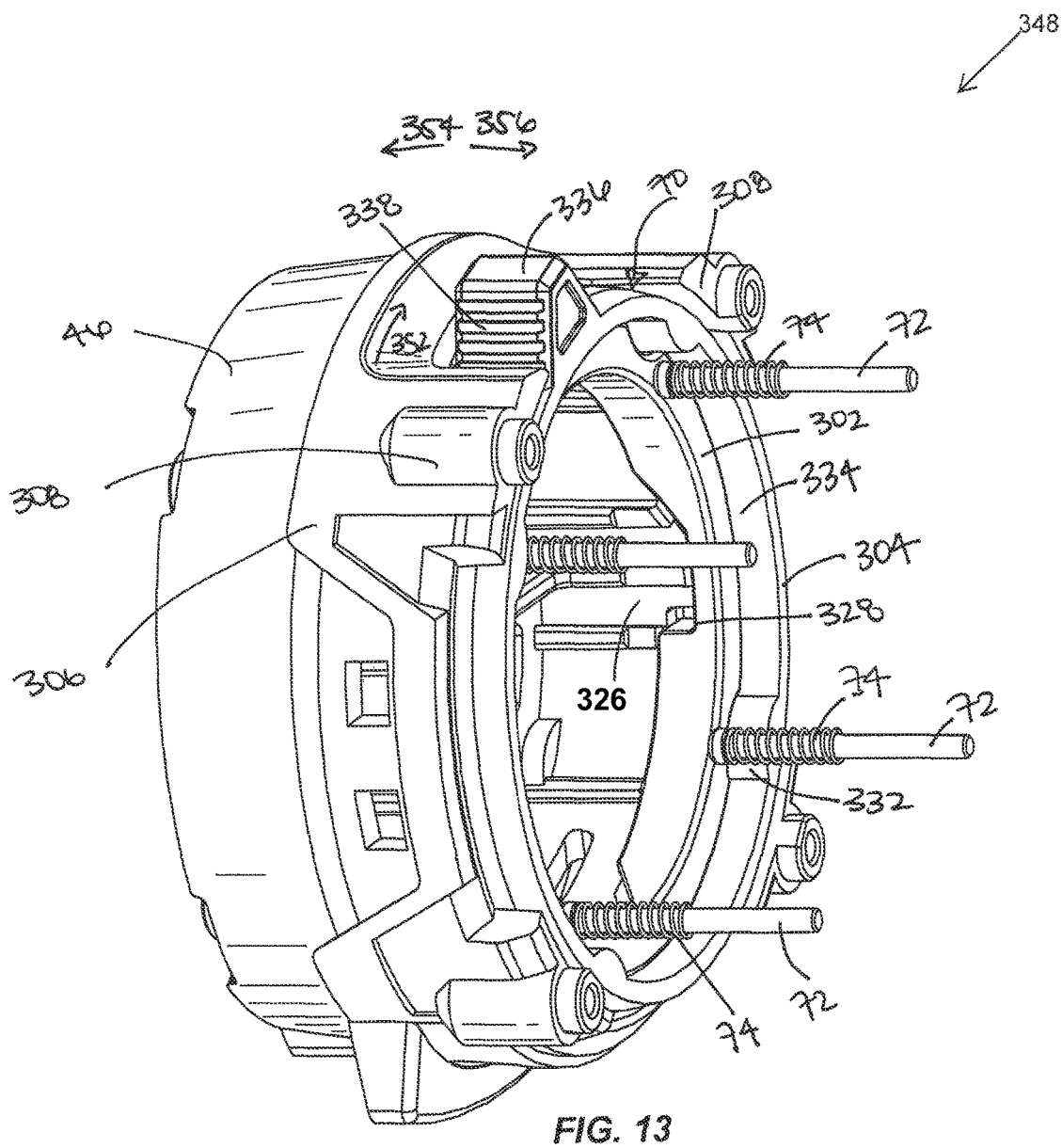
FIG. 13 is a perspective view of the switch ring of FIG. 10 in a first position.
Figure 14:
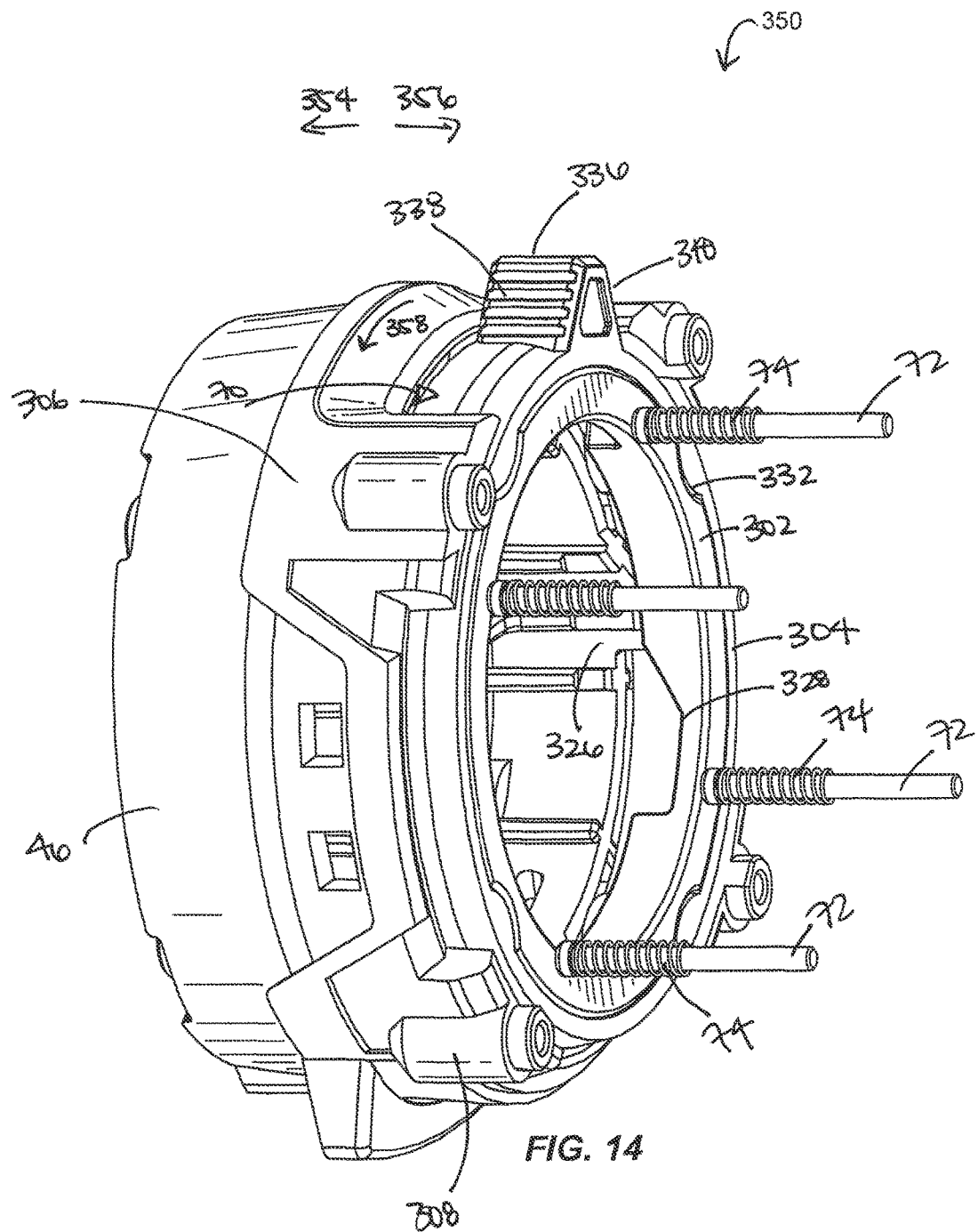
FIG. 14 is a perspective view of the switch ring of FIG. 10 in a second position.

Further with respect to FIGS. 13-14, rotation of the switch ring 304 between the locked position 348 and the unlocked position 350 by the switch ring actuator 336 simultaneously rotates the cam ring 302 thereby moving the cam ring 302 axially relative to the power base 100 due to its camming arrangement with the gearcase backplate 306. As discussed in further detail below, axial movement of the cam ring 302 moves the trigger lockout mechanism 300 between the locked position (FIG. 13) and the unlocked position (FIG. 14), in order to unlock and relock the trigger 124.

In operation, rotation of the switch ring 304 from the locked position 348 to the unlocked position 350 is implemented by a force, indicated by arrow 352, applied to the first surface 338 of the switch ring actuator 336. The force moves the protrusion 324 from the first recess 342 into the arcuate recess 346 against the bias of the spring 318. The arcuate recess 346 guides the protrusion 324 to the second recess 344. Because the arcuate recess 346 is more shallow than the first recess 342, the bumper 320 is forced in the direction of arrow 354, which compresses the spring 318. When the protrusion 324 reaches the second recess 344, the bias of the spring 318 launches the bumper 320 in the direction of arrow 356 thereby seating the protrusion 324 in the second recess 344 such that the switch ring 304 achieves and is maintained in the unlocked position 350. Once the switch ring 304 is moved into unlocked position 350, the detent mechanism retains the switch ring 304 in the unlocked position 350 until the switch ring 304 is manually moved back to the locked position 348.

Rotation of the switch ring 304 from the locked position 348 to the unlocked position 350 simultaneously rotates the cam ring 302 therewith. Actuation of the switch ring actuator 336 causes the surfaces 328 to ride the projections 326 thereby displacing the cam ring 302 in an axial direction generally parallel to the axis A and away from the backplate 306 towards the power base. As described above with respect to FIGS. 1-8, axial displacement of the cam ring 302 communicates axial displacement of the one pin 72 received within the boss 106. The other pins 72 not received within the boss 106 are also displaced, but are redundant to allow the tool head 20 to be attached to the power base 100 in multiple orientations about the axis A. As such, the one pin 72 is displaced in an axial direction generally parallel to the axis A and away from the backplate 306 towards the power base, and therefore into contact with a lockout button 116 to actuate the lockout button 116 such that the trigger 124 is depressible.

Similarly, rotation of the switch ring 304 from the unlocked position 350 back to the locked position 348 is implemented by a force, indicated by arrow 358, applied to the second surface 340 of the switch ring actuator 336. The force moves the protrusion 324 from the second recess 344 into the arcuate recess 346 against the bias of the spring 318. When the protrusion 324 reaches the first recess 342, the bias of the spring 318 launches the bumper 320 in the direction of arrow 356 thereby seating the protrusion 324 in the first recess 342 such that the switch ring 304 achieves and is maintained in the locked position 348. Once the switch ring 304 is moved into the locked position 348, the detent mechanism retains the switch ring 304 in the locked position 348 until the switch ring 304 is manually moved back to the unlocked position 350.

Rotation of the switch ring 304 from the unlocked position 350 to the locked position 348 simultaneously rotates the cam ring 302 therewith. As described above with respect to FIGS. 1-8, actuation of the switch ring actuator 336 displaces the cam ring 302 in an axial direction generally parallel to the axis A and toward the backplate 306 such that the surfaces 328 are once again mated with the projections 326. Therefore, the pin 72 is no longer axially displaced away from the backplate 44 and necessarily no longer in contact with the lockout button 116 to actuate the lockout button 116 such that the trigger 124 is no longer depressible.

Thus, constructions of the invention provide, among other things, a power tool system including a tool head having a rotatable trigger lockout mechanism and a power base having a trigger such that the trigger lockout mechanism forces the operator to manually unlock the trigger. Various features of the invention are set forth in the following claims.

What is claimed is:

1. A power tool comprising:
   a power base including a trigger and a motor, the trigger actuatable to drive the motor; and
   a tool head driven by the motor, the tool head including a lockout mechanism that inhibits actuation of the trigger in a locked position;
   wherein the lockout mechanism is manually rotatable from the locked position to an unlocked position in which the trigger is actuatable to drive the motor.

2. The power tool of claim 1, wherein the lockout mechanism further comprises:
   a rotatable cam ring having cam surfaces;
   wherein rotation of the cam ring causes axial displacement of the cam ring into the unlocked position.

3. The power tool of claim 2, wherein the lockout mechanism further comprises:
   a rotatable switch ring actuatable by a user and coupled with the cam ring;
   wherein rotation of the switch ring causes rotation of the cam ring.

4. The power tool of claim 3, the lockout mechanism further comprising:
   a gearcase including a backplate having a plurality of projections;
   wherein the cam ring is disposed adjacent the backplate, and wherein the cam surfaces ride the projections during rotation of the cam ring to effect axial displacement of the cam ring.

5. The power tool of claim 3, wherein the switch ring is rotatable from the locked position to the unlocked position in a clockwise direction and a counterclockwise direction.

6. The power tool of claim 3, wherein the lockout mechanism further comprises a switch ring actuator, wherein a switch ring actuator extends through a housing of the tool head for being manually accessible.

7. The power tool of claim 3, wherein the lockout mechanism further comprises a detent mechanism that retains the switch ring in one of the locked or unlocked positions such that the switch ring must be manually moved between the locked and unlocked positions by a switch ring actuator actuatable by the user.

8. The power tool of claim 7, wherein the switch ring is rotatable from the locked position to the unlocked position in a first direction, the switch ring retained in the unlocked position by the detent mechanism.

9. The power tool of claim 7, wherein the switch ring is rotatable from the unlocked position to the locked position in a second direction, the switch ring retained in the locked position by the detent mechanism.

10. The power tool of claim 2, the lockout mechanism further comprising a pin, wherein rotation of the cam ring causes axial displacement of the pin.

11. The power tool of claim 10, wherein the power base includes a safety device for inhibiting activation of the motor, wherein rotation of the cam ring displaces the cam ring in the direction of the power base thereby pushing the pin axially towards the safety device such that contact between the pin and the safety device disables the lockout mechanism.

12. The power tool of claim 1, wherein the tool head is attachable to the power base in at least four angular orientations.

13. The power tool of claim 1, wherein the tool head is removably coupled to the power base such that the tool head is selectively removable from the power base.

14. The power tool of claim 1, wherein the lockout mechanism is rotatably mounted on the tool head.

15. The power tool of claim 1, wherein the lockout mechanism is manually rotatable from the locked position to the unlocked position while remaining coupled to the tool head.

16. The power tool of claim 1, wherein the lockout mechanism includes an annular switch ring manually rotatable from the locked position to the unlocked position.

17. The power tool of claim 1, wherein the lockout mechanism includes an annular switch ring defining a central axis, wherein the annular switch ring is manually rotatable from the locked position to the unlocked position about the central axis.

18. A power tool comprising:
    a power base including a trigger and a motor, the trigger actuatable to drive the motor; and
    a tool head driven by the motor, the tool head including a lockout mechanism that inhibits actuation of the trigger in a locked position;
    wherein the lockout mechanism includes a manually engageable actuation surface disposed on an exterior of the power tool when the power base and the tool head are coupled to each other;
    wherein the lockout mechanism is manually rotatable, by way of the manually engageable actuation surface, from the locked position to an unlocked position in which the trigger is actuatable to drive the motor.

19. A power tool comprising:
    a power base including a trigger and a motor, the trigger actuatable to drive the motor, wherein the motor defines a motor axis; and
    a tool head driven by the motor, the tool head including a lockout mechanism that inhibits actuation of the trigger in a locked position;
    wherein the lockout mechanism is manually rotatable about an axis substantially parallel with the motor axis from the locked position to an unlocked position in which the trigger is actuatable to drive the motor.

* * * * *